UNITED STATES PATENT OFFICE.

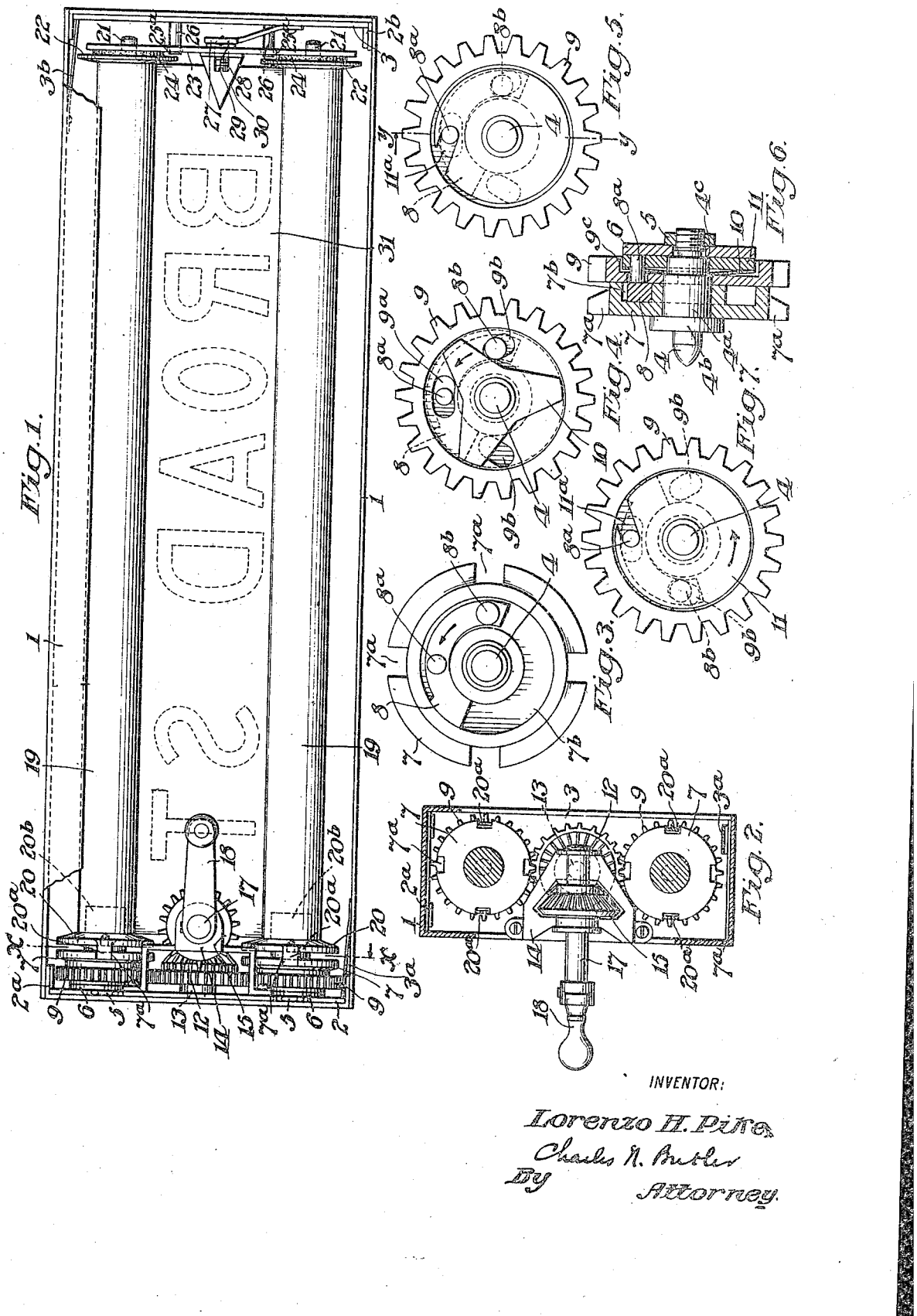

LORENZO H. PIKE, OF PHILADELPHIA, PENNSYLVANIA, ASSIGNOR TO ELECTRIC SERVICE SUPPLIES COMPANY, OF PHILADELPHIA, PENNSYLVANIA, A CORPORATION OF PENNSYLVANIA.

CLUTCHING MECHANISM.

1,255,926.  Specification of Letters Patent.  Patented Feb. 12, 1918.

Original application filed January 16, 1915, Serial No. 2,523. Divided and this application filed April 3, 1917. Serial No. 159,445.

*To all whom it may concern:*

Be it known that I, LORENZO H. PIKE, a citizen of the United States, residing in the city of Philadelphia, county of Philadelphia, and State of Pennsylvania, have invented certain Improvements in Clutching Mechanism, of which the following is a specification.

My improved clutching mechanism is designed especially for the operation of display signs used on street or other railways and transportation lines, for the purpose of indicating routes, streets, or places, and this application is a division of my application for patent on improvements in display signs filed on the 16th day of January, 1915, No. 2523. It will, however, be understood that my improved clutching mechanism is adapted for various uses, as, for example, where it is desired to operate a curtain, cable, or the like in reverse directions.

The improvements are characterized by superior efficiency in operation, together with simplicity of construction, assemblage and dissociation.

In the accompanying drawings, Figure 1 is a rear elevation of mechanism embodying the improvements of my invention; Fig. 2 is a part sectional elevation taken on the line $x$—$x$ of Fig. 1; Fig. 3 is a face view of a clutch-disk with a clutch-pawl and an arbor therein; Fig. 4 is a face view of a pinion, with a spring therein, applied to the construction shown in Fig. 3; Fig. 5 is a face view of the construction shown in Fig. 4 with a cam disk applied thereto; Fig. 6 is a sectional view on the line $y$—$y$ of Fig. 5; and Fig. 7 is a face view of mechanism similar to that shown in Fig. 5 with reverse parts for effecting opposite action.

The mechanism illustrated in the drawings represents a form of display apparatus in which the invention is embodied, and comprises the housing 1 having the plates 2 and 3 engaged in its opposite ends by the respective cleats $2^a$ and $2^b$ and springs $3^a$ and $3^b$.

The plate 2 receives the outer ends of the arbors 4, with the nuts 5 thereon, and has fixed thereto the plates 6 which hold in place the arbors with the mechanism carried thereby.

Clutch disks 7, provided with the peripheral notches $7^a$ and the circular ways or channels $7^b$, are journaled on the arbor bodies $4^a$ against the flanges $4^b$, the respective channels containing the right and left hand clutching pawls or friction segments 8 provided with the studs $8^a$ and $8^b$. Pinions 9, each provided with a curved slot $9^a$ for receiving a stud $8^a$ and with oppositely inclined cam slots $9^b$ for receiving either stud $8^b$, are made to be used interchangeably with either clutching segment 8, and are journaled on the bodies $4^a$ in contact with the disks 7 by which the segments are retained in the channels $7^b$, each pinion having a circular recess $9^c$ disposed opposite the corresponding channel $7^b$ and into which the corresponding stud $8^a$ projects. Dished springs 10 are engaged on the arbor bearings $4^c$, against the ends of the larger bearings $4^a$, and disks 11, provided with the oppositely inclined cam slots $11^a$ for engaging the respective studs $8^a$, are journaled on the bearings $4^c$, where they are held by the plates 6.

A spur and bevel gear 12 is journaled on a stud 13 which is carried by the plate 2 and a bracket 14 fixed thereto. This gear engages the gears 9 and a bevel gear 15 which is fixed on a shaft 17 journaled in the bracket, the shaft being turned by a handle 18 fixed thereon.

Rollers 19 have fixed on ends thereof flanges 20 provided with clutching fingers $20^a$ for engaging the notches $7^a$, the flanges being fixed to recessed plugs or sockets $20^b$ which are set in the ends of the rollers and engage the arbors 4.

Arbors 21 and flanges 22 are fixed to the opposite ends of the rollers 19, these arbors passing through the break plate 23 with the friction washers 24 fixed thereon and the washers engaging the flanges. The plate 23 is provided with usual notches $25^a$ engaged on studs 26 carried by the plate 3, the notches permitting the plate 23 to be moved along and transversely to the studs for adjustment, assemblage and dissociation. A spring 27 is fixed to the plate 3 and presses the plate 23 toward the rollers so as to frictionally engage the parts 22 and 24, a stud 28 passing through the plate, together with a nut 29, and engaging the spring to hold the parts in the desired relation. A pointer 30 is connected to the plate 23 and provides means for guiding the operator in positioning the curtain 31, which is carried by the rollers 19 and bears the indicia to be displayed.

In operation, when the handle 18 is turned anti-clockwise, the revolving shaft 17 causes the gear 15 to revolve the gear 12, which turns the gears 9. The lower gear 9 now acts to revolve the corresponding friction pawl 8 in the direction of the arrow, as shown in Fig. 3, the pawl being rocked by the action of the cam $9^b$ of the gear on the stud $8^b$ of the pawl and the action of the cam $11^a$ of the disk 11 on the stud $8^a$ of the pawl to frictionally clutch and revolve the corresponding disk 7, the cam $11^a$ acting on the stud $8^a$ to move the pawl outwardly to positively engage the outer wall of the channel $7^b$. This disk, being thus frictionally engaged to and revolved by the lower gear 9, acts through the parts 20 and $20^a$ on the lower roller 19 to wind thereon the curtain 31, which is drawn off the upper roller 19. The revolution of the upper gear 9, simultaneously with the described operation of the lower gear, moves the reversely disposed upper pawl 8, as an idler, in the direction of the arrow of Fig. 7, the upper cam slot $9^b$ acting on the stud $8^b$ therein and the upper cam slot $11^a$ acting on the corresponding center stud $8^a$ to control the upper pawl by drawing it inwardly toward the center of revolution so as to prevent locking and wear in the differential reverse movement when the upper roller 19, by reason of the diameter of the curtain wound thereon, runs faster in unwinding than the upper gear.

The reverse movement of the upper roller is thus permitted an automatically differentiated speed with reference to that of the lower roller, the curtain between the rollers being held taut by the action of the brake.

When the handle is turned clockwise, the foregoing operation is reversed.

Having described my invention, I claim:

1. The combination with a device containing a circular way, of mechanism comprising a frictional clutching member movable in said way and coöperating cams each adapted for controlling said member.

2. The combination with a revoluble device containing a circular way, of revoluble mechanism comprising a frictional clutching member revoluble in said way, a revoluble device provided with a cam connected with and acting to control said member, and a second revoluble device concentric with said device first named and provided with a cam connected with and acting to control said member.

3. The combination with a revoluble device containing a circular way, of a frictional clutching member movable in said way, said member provided with studs, a revoluble device having means for engaging one of said studs to control said member, a further revoluble device having means for engaging one of said studs to control said member and means for restraining the movement of said further revoluble device.

4. The combination of a revoluble device, a frictional clutching device adapted to engage said device first named, a second revoluble device provided with a cam, means whereby said clutching device and said second revoluble device are connected and said cam acts to control the action of said clutching device, a third revoluble device provided with a cam with which said clutching device is connected so as to be controlled thereby, and a spring for frictionally controlling said third revoluble device.

5. The combination of a revoluble mechanism having a circular way, a clutching device movable relative to said way and adapted for coacting with said mechanism, a revoluble wheel whereby said device is revolved, a revoluble cam, and means whereby said cam operates said device to clutch and unclutch said mechanism upon the revolution of said wheel in opposite directions.

6. The combination of a mechanism comprising a roller and clutching means connected to revolve together, a clutching device adapted for coaction with said clutching means to revolve said roller, a wheel concentric with said roller and clutching means, means whereby said wheel revolves said device, a revoluble cam connected with said wheel, and means whereby said cam operates said device to clutch and unclutch said clutching means upon the revolution of said wheel in opposite directions.

7. The combination of an arbor, a roller centered on said arbor, a clutching member fixed to said roller, revoluble clutching means with which said member is adapted to be engaged, a clutching segment adapted to coact with said means, a revoluble wheel, a cam carried by said wheel, and means whereby said cam effects the engagement and disengagement of said clutching means and segment upon the revolution of said wheel in opposite directions.

8. The combination of an arbor, a clutching member journaled on said arbor, a clutching device adapted for frictionally engaging said member, a wheel journaled on said arbor, means whereby said device is connected in movable relation with said wheel, a cam journaled on said arbor, a frictional device for retarding the movement of said cam, and means whereby said cam controls said clutching device.

9. The combination of an arbor, clutching mechanism on said arbor, a roller having means engaging said arbor and mechanism, a clutching member adapted for engaging said mechanism, a wheel on said arbor revoluble relatively to said mechanism, a cam on said arbor relative whereto said wheel is adapted to turn, a spring for retarding the movements of said cam, and means whereby said wheel effects the engagement and disengagement of said member with relation to said mechanism.

10. The combination with an arbor comprising a center, a cylindrical body and a flange between them, of a roller having a clutching device for revolving it and means for engaging said center, a member journaled on said body, said member having clutching means for engagement with said device and a cylindrical surface, a pawl adapted for frictionally engaging said surface, a wheel having a cam journaled on said body, and means whereby said wheel and cam operate said pawl.

11. The combination with a revoluble device provided with a circular channel, of a friction pawl movable in said channel, a revoluble wheel, means comprising a stud and a cam whereby the revolution of said wheel in reverse directions engages and disengages said pawl relatively to said device, and means for preventing the locking of said pawl by the reverse movement of said device relatively thereto.

12. The combination with a revoluble device provided with a circular way, of a friction pawl movable in said way and provided with studs, a revoluble wheel provided with a bearing in which one of said studs is engaged and a cam slot in which the other of said studs is engaged, a revoluble disk containing a cam slot registering with said bearing and engaging the stud therein, and means for retarding the movement of said disk.

In testimony whereof I have hereunto set my name this 31st day of March, 1917.

LORENZO H. PIKE.

Copies of this patent may be obtained for five cents each, by addressing the "Commissioner of Patents, Washington, D. C."